United States Patent Office 2,765,321
Patented Oct. 2, 1956

2,765,321

PROCESS OF MAKING CRYSTALLINE WARFARIN SODIUM

Collin H. Schroeder, Madison, and Karl Paul Link, Middleton, Wis., assignors to Wisconsin Alumni Research Foundation, Madison, Wis., a corporation of Wisconsin No Drawing. Application May 27, 1955,
Serial No. 511,764

4 Claims. (Cl. 260—343.2)

The present invention relates to warfarin known chemically as 3-($\alpha$-acetonylbenzyl)-4-hydroxycoumarin, and more specifically to an improved process of preparing the crystalline sodium derivative thereof, i. e. crystalline warfarin sodium.

The use of warfarin sodium in both the rodenticide field and clinical field have been reported in the literature. An improved process of preparing aqueous solutions of warfarin sodium calling for the reaction of sodium hydroxide with an aqueous slurry containing excess warfarin and the recovery of the solid salt in an amorphous state from the resulting solution by the use of ethanol is described in the copending application of one of us, Karl Paul Link, Serial No. 335,391, filed February 5, 1953. As pointed out in this prior Link application, the solid alkali metal derivatives prepared by previously known methods proved to be highly hygroscopic and to be unstable on standing as evidenced by change in color, turning into gummy or glass type masses and the like. While the process described in the Link application, supra, has been successfully employed for the preparation of stable, solid warfarin salt derivatives, it possesses certain disadvantages particularly for use in large scale operations. In view of this, investigations were continued searching for an improved process of preparing in particular crystalline, stable warfarin sodium which could be readily maintained in the desired free flowing form.

During our investigations or attack on this problem, various types of procedures were tried in attempts to obtain crystalline warfarin sodium in the desired stable form. The use of dry systems in accordance with "text book" know-how when dealing with enolic materials such as warfarin were further investigated but failed to provide a satisfactory solution to the problem. Also tried was the so-called salting out procedure calling for the addition of sodium or potassium chloride to aqueous solutions of warfarin sodium. No crystalline warfarin sodium could be obtained by the use of either salt. The addition of lithium sulfate was also tried. While this salt gave a precipitate it proved completely unsatisfactory as the lithium sulfate co-precipitated with the warfarin sodium. The problem was solved when lithium halides such as lithium chloride and lithium bromide were investigated. These halide salts when added to aqueous water miscible lower aliphatic alcohol solutions of warfarin sodium were found to induce the separation of substantially all of the warfarin sodium in the desired crystalline state. The crystalline warfarin sodium was also found to be substantially free from lithium salt contamination, e. g. to be 99.8–99.9 percent warfarin sodium based on the volumetric chloride test, and on drying to be a stable free flowing crystalline sodium derivative or salt of the type desired. The following example will serve to illustrate the invention.

Example

To 50 ml. of about a 23 percent by weight aqueous solution of warfarin sodium prepared as described in Example III of U. S. application Serial No. 335,391, supra, was added 15 ml. of absolute ethanol and 4.3 g. of lithium chloride with stirring. All of the lithium chloride dissolved in a few minutes (warming of the reaction mixture occurred due to heat of solution of Li Cl) and the solution was stirred for one hour at room temperature. The stirring was then continued for an additional 3–4 hours at about 4° C. The crystalline warfarin sodium obtained was removed by filtration. It can be worked up in various ways, the following being merely illustrative. The resulting warfarin sodium cake was triturated with a mixture of 10 ml. of t.-butyl alcohol and 25 ml. of dry ethyl ether and again collected on a filter. Traces of t.-butyl alcohol are next removed by washing with ethyl ether. The warfarin sodium is then dried, e. g. under vacuum for 4–6 hours. It is obtained as a stable white free-flowing crystalline product in excellent yield.

The warfarin sodium solutions employed in the present invention can be prepared by various means known in the art. However, as idicated above the solutions are preferably prepared by reacting aqueous sodium hydroxide with excess warfarin (preferably in the form of an aqueous warfarin slurry), the excess warfarin being removed by filtration. The concentration of the warfarin sodium solution is the least important variable. The higher the warfarin sodium concentration of the initial aqueous solution keeping other variables constant the higher the yield calculated on the percent of the total warfarin sodium separated. However, concentrations of more than about 25 percent aqueous warfarin sodium solutions should ordinarily not be employed as the solutions become too viscous and some difficulty in manipulation is encountered. The amount of lithium halide (chloride or bromide) added to the warfarin sodium aqueous-alcoholic solution should be adequate to cause separation of substantially all of the warfarin sodium. In general, the higher the lithium halide concentration the higher the yield. However, the lowest possible concentration of lithium halide should be used as the lithium salt tends to occlude on the warfarin sodium crystals. The optimum amount of lithium halide to be employed with warfarin sodium solutions of various concentrations can be readily ascertained by preliminary test. The addition of an alcohol to the solutions prior to crystallization of warfarin sodium is essential. Any lower aliphatic alcohol that is miscible with water (e. g. methanol, ethanol and propanol) can be employed. The optimum amount of alcohol to be employed varies with the alcohol used, the concentrations of warfarin sodium, etc., but can be readily ascertained by preliminary test. In general, the greater the percent by volume of alcohol used the lower the yield. However, the alcohol should be present in at least about 25 percent by volume based on the water present. The washing or triturating of the separated crystals with organic solvents is optional but is usually preferred as it aids in the removal of any unwanted organic material and occluded lithium salt that may be present. Various temperatures can also be employed during separation although the use of temperatures of about 0° to 20° C. and preferably below room temperature have been found to hasten the separation of the warfarin sodium. In practice it has been found that stirring during crystallization of warfarin sodium reduces the size of the warfarin sodium crystals and aids in avoiding possible occlusion of the lithium halide salt. The crystalline warfarin sodium is stable at temperatures up to 200° C. and can be dried by various procedures known in the art although when heating is employed the drying temperatures in all cases should be substantially below 225–255° C. the temperature at which the warfarin sodium melts, fuses and undergoes decomposition. The dry warfarin sodium obtained by the process of the present invention is a stable white crystalline product and does not change in color or turn to gummy or glass type masses on standing. Storage under various conditions have shown the product to be substantially nonhygroscopic and to remain in the desired crystalline free flowing form especially adaptable for use in the clinical anticoagulant field as well as the rodenticide field.

We claim:

1. In the process of preparing crystalline, stable, free flowing warfarin sodium from aqueous solutions of warfarin sodium prepared by reacting aqueous sodium hydroxide with excess warfarin and the removal of the excess warfarin, the improvement which comprises adding about 25 percent by volume of ethanol to the warfarin sodium solution, adding lithium chloride to the aqueous-ethanol solution, stirring the resulting solution while cooling below room temperature, and recovering the resulting warfarin sodium crystals from the mixture.

2. In the process of preparing crystalline, stable, free flowing warfarin sodium from aqueous solutions of warfarin sodium, the improvement which comprises adding a water miscible lower aliphatic alcohol to the solution and crystallizing the warfarin sodium by addition of a salt selected from the group consisting of lithium chloride and lithium bromide to the resulting aqueous-alcohol solution.

3. The process of preparing crystalline, stable, free flowing warfarin sodium which comprises adding a salt selected from the group consisting of lithium chloride and lithium bromide to an aqueous-water miscible lower aliphatic alcohol solution of warfarin sodium, recovering the resulting warfarin sodium crystals and drying the same.

4. The process of preparing crystalline, stable, free flowing warfarin sodium which comprises adding lithium chloride to an aqueous-ethanol solution of warfarin sodium, stirring the resulting solution while cooling below room temperature, recovering the resulting warfarin sodium crystals and drying the crystals.

References Cited in the file of this patent

UNITED STATES PATENTS

| 2,427,578 | Stahmann et al. | Sept. 16, 1947 |
| 2,648,682 | Stoll et al. | Aug. 11, 1953 |

FOREIGN PATENTS

| 568,112 | Great Britain | Mar. 19, 1945 |